US011001365B2

(12) United States Patent
Wilson et al.

(10) Patent No.: US 11,001,365 B2
(45) Date of Patent: May 11, 2021

(54) AIRCRAFT WING WITH A MOVEABLE WING TIP DEVICE FOR LOAD ALLEVIATION

(71) Applicant: Airbus Operations Limited, Bristol (GB)

(72) Inventors: Thomas Wilson, Bristol (GB); Martin Herring, Bristol (GB); John Pattinson, Bristol (GB); Jonathan Cooper, Bristol (GB); Andrea Castrichini, Bristol (GB); Rafic Ajaj, Southampton (GB); Hitul Dhoru, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 206 days.

(21) Appl. No.: 16/067,221

(22) PCT Filed: Sep. 29, 2016

(86) PCT No.: PCT/GB2016/053029
§ 371 (c)(1),
(2) Date: Jun. 29, 2018

(87) PCT Pub. No.: WO2017/118832
PCT Pub. Date: Jul. 13, 2017

(65) Prior Publication Data
US 2019/0002083 A1    Jan. 3, 2019

(30) Foreign Application Priority Data
Jan. 5, 2016    (GB) ..................... 1600163

(51) Int. Cl.
*B64C 3/38* (2006.01)
*B64C 3/54* (2006.01)
(Continued)

(52) U.S. Cl.
CPC ............... *B64C 3/546* (2013.01); *B64C 3/56* (2013.01); *B64C 13/16* (2013.01); *B64C 23/065* (2013.01); *B64C 23/072* (2017.05); *Y02T 50/10* (2013.01)

(58) Field of Classification Search
CPC .. B64C 3/42; B64C 3/56; B64C 3/546; B64C 13/16; B64C 23/065; B64C 23/072
See application file for complete search history.

(56) References Cited

U.S. PATENT DOCUMENTS 2,105,307 A     1/1938   Akerman
5,988,563 A  *  11/1999  Allen .................. B64C 3/42
                                                  244/49

(Continued)

FOREIGN PATENT DOCUMENTS

DE    10 2010 064 539    3/2015
JP          08-104296    4/1996
WO         2015/150816   10/2015

OTHER PUBLICATIONS

Castrichini et al. "Preliminary Investigation of Use of Flexible Folding Wing-Tips for Static and Dynamic Loads Alleviation" (Oct. 2014).

(Continued)

*Primary Examiner* — Richard G Davis
(74) *Attorney, Agent, or Firm* — Nixon & Vanderhye P.C.

(57) ABSTRACT

An aircraft is disclosed having a wing, the wing having a fixed wing with a wing tip device moveably mounted about a hinge at the tip thereof. The wing tip device is operable between a flight configuration, and a load alleviating configuration for load alleviation during flight. The aircraft includes a restraining assembly operable between a restraining mode in which the wing tip device is held in the flight configuration using a restraining force such as by a brake, and a releasing mode in which the restraining force on the (Continued)

wing tip device is released, such that the wing tip device may adopt the load alleviating configuration.

21 Claims, 8 Drawing Sheets

(51) Int. Cl.
  *B64C 3/56* (2006.01)
  *B64C 23/06* (2006.01)
  *B64C 13/16* (2006.01)

(56) References Cited

U.S. PATENT DOCUMENTS

| | | | |
|---|---|---|---|
| 7,275,722 B2 | 10/2007 | Irving et al. | |
| 7,744,038 B2* | 6/2010 | Sankrithi | B64C 23/072 244/199.4 |
| 8,757,555 B2* | 6/2014 | Werthmann | B64C 23/072 244/199.4 |
| 2004/0000619 A1* | 1/2004 | Barriety | B64C 3/52 244/219 |
| 2005/0133672 A1* | 6/2005 | Irving | B64C 23/072 244/201 |
| 2012/0085858 A1 | 4/2012 | Seifert | |
| 2013/0099060 A1 | 4/2013 | Dees et al. | |

OTHER PUBLICATIONS

Castrichini et al. "Nonlinear Folding Wing-Tips for Gust Loads Alleviation" (Feb. 2016).
Castrichini et al. "Nonlinear Folding Wing-Tips for Gust Loads Alleviation" (Jan. 2015).
Castrichini et al. "Nonlinear Negative Stiffness Wing-Tip Spring Device for Gust Loads Alleviation" (Jan. 2016).
Cooper et al. "Preliminary Study of Use of Folding Wing-tips for Loads Alleviation" (Mar. 2013).
Pattinson et al. "High Fidelity Simulation of the Folding Wing Tip for Loads Alleviaton" (Jun. 2015).
Castrichini et al. "Preliminary Investigation of Use of Flexible Folding Wing-Tips for Static and Dynamic Loads Alleviation" (Nov. 2016).
Castrichini et al. "Nonlinear Negative Stiffness Wing-Tip Spring Device for Gust Loads Alleviation" (Jan. 4-8, 2016).
Combined Search and Examination Report for Application No. GB1600163.8, nine pages, dated Jul. 1, 2016.
International Search Report and Written Opinion of the ISA for PCT/GB2016/053029 dated Dec. 6, 2016, 12 pages.

* cited by examiner

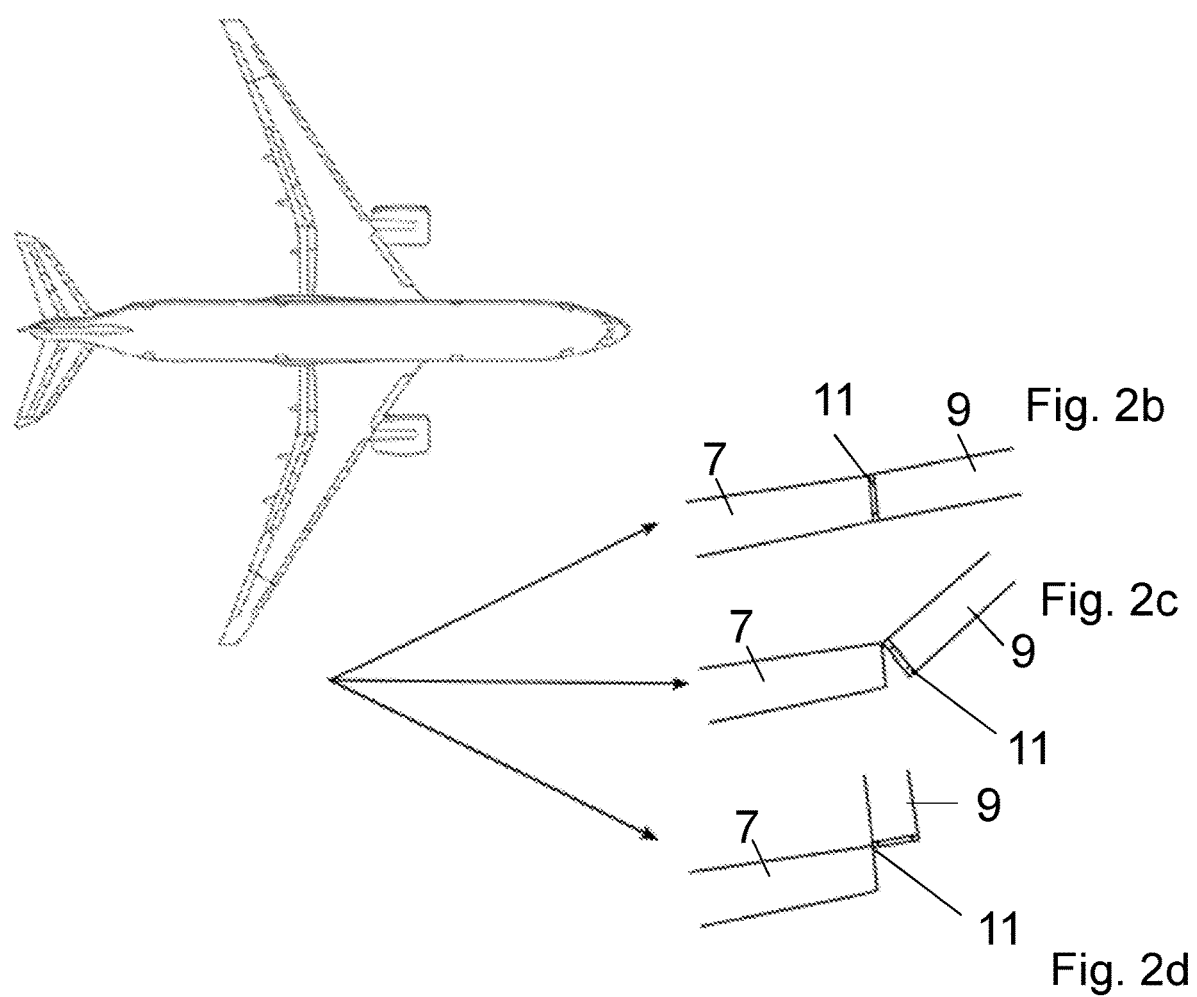

AIRCRAFT WING WITH A MOVEABLE WING TIP DEVICE FOR LOAD ALLEVIATION

CROSS RELATED APPLICATIONS

This application is the U.S. national phase of International Application No. PCT/GB2016/053029 filed Sep. 29, 2016 which designated the U.S. and claims priority to Great Britain Application No. GB 1600163.8 filed Jan. 5, 2016, the entire contents of each of which are hereby incorporated by reference.

BACKGROUND OF THE INVENTION

Using a moveable wing tip device specifically to provide load alleviation during flight is known. U.S. Pat. No. 5,988,563 discloses an arrangement in which a foldable winglet is pivotable, about a line-of-flight orientated hinge, between a retracted and extended position during flight. When the aircraft reaches cruise, an actuator can be manually or automatically energised to pivot the winglet from a vertical position to an extended position. When severe loads are encountered (for example during a dive), the loads (on the foldable winglet) overcome the action of the actuator and pivot the winglet back to its vertical position. This action serves to reduce the bending moment acting on the wing. In U.S. Pat. No. 5,988,563, the winglets are not locked in the extended position, but only remain extended as long as the torque of the actuator to extend the wing, is greater than any opposing aerodynamic moment. Because the forces acting on the wings function to rotate the winglets, the effect is said to be of passive load alleviation which eliminates the need to command actuators to return the winglets to their retracted positions (i.e. to reduce the loads).

Another example of using moveable wing tip devices for load alleviation is shown in U.S. Pat. No. 7,275,722. In this arrangement, the wing tip device is rotatably moveable to a load-alleviating position using either active or passive means. The axis of rotation of the wing tip device is such that when the wing tip device is rotated to a load alleviating configuration, its mean incidence reduces.

A paper entitled "Preliminary Study of Use of Folding Wing-tips for Loads Alleviation" dated 31 Mar. 2013 by Cooper et al, investigates the relationship between the orientation of a hinge line of a moveable wing tip device, and the magnitude of load alleviation when the wing tip device rotates about that hinge. That study found that a hinge that was perpendicular to the wing box/mean chord line enabled a reduction in the shear force and bending moment distribution compared to a hinge that was orientated in a streamwise direction.

There is a trend towards increasingly large passenger aircraft, for which it is desirable to have correspondingly large wing spans. However, the maximum aircraft span is effectively limited by airport operating rules which govern various clearances required when manoeuvring around the airport (such as the span and/or ground clearance required for gate entry and safe taxiway usage). To address this problem, various arrangements comprising moveable wing tip devices, that specifically enable the span to be reduced in a ground configuration, have been suggested. US2013/0099060, and WO2015/150816 are examples of such an arrangement.

Using such moveable wing tip devices to provide a large span during flight is beneficial in terms of induced drag reduction, but it tends to increase the aerodynamic loads on the wing during use, and therefore tends to necessitate a stronger and heaver wing (the weight of the wing tends to be roughly proportional to $span^3$).

SUMMARY OF THE INVENTION

According to a first aspect of the invention, there is provided an aircraft comprising a wing, the wing having a fixed wing with a wing tip device moveably mounted at the tip thereof, wherein the fixed wing has an upper surface and a lower surface, and the wing tip device has an upper surface and a lower surface, and the wing tip device is operable between: (i) a flight configuration for use during flight, in which configuration the upper and lower surfaces of the wing tip device are continuations of the upper and lower surfaces of the fixed wing; and (ii) a load alleviating configuration for load alleviation during flight, in which configuration the wing tip device is moved relative to the fixed wing such that at least one of the upper and lower surfaces of the wing tip device is moved away from the respective surface of the fixed wing, and the load on the wing is reduced; characterised in that the aircraft comprises a restraining assembly operable between a restraining mode in which the wing tip device is held in the flight configuration using a restraining force, and a releasing mode in which the restraining force on the wing tip device is released, such that the wing tip device is able to adopt the load alleviating configuration.

Providing a restraining assembly that is operable into a releasing mode in which the restraining force is released, has been found to be especially beneficial. For example, the wing tip device can be securely held in the flight configuration during normal cruise flight, but if the aircraft encounters gusts, or other high load events, the restraining force can be released such that the wing tip device is movable quickly to the load alleviating configuration. This may mean the wing can avoid being subjected to high gust loadings. This in turn may enable the wing to have a relatively large span, without necessarily having to incur the associated weight penalty, because it can be designed for a lower magnitude of maximum load.

The default (passive) mode of the restraining assembly is preferably the restraining mode. For example in embodiments incorporating a brake, the default (passive) state of the brake is preferably such that it is acting to restrain the wing tip device. The restraining assembly preferably needs activating, for example via an input signal, in order to switch to the releasing mode. Such an arrangement has been found to be beneficial because it ensures an 'active' step will be required to move it to the releasing mode, thereby removing the risk of uncommanded actuation to the releasing mode. For example in embodiments incorporating a brake, the brake preferably needs to be switched ON in order to release the brake and release the wing tip device.

In principle, the wing tip device may be entirely passively actuated to the load-alleviating configuration once the restraining assembly is in releasing mode. For example it may be moved under the action of aerodynamic forces urging the wing tip device towards the load-alleviating configuration. In some embodiments of the invention, the wing may comprise a biasing member, arranged such that when the wing tip device is in the flight configuration, the biasing member exerts a biasing force to urge the wing tip device towards the load alleviating configuration. Such an arrangement has been found to be beneficial because it tends to reduce the lag between the restraining assembly adopting the releasing mode, and the wing tip device actually moving to the load alleviating configuration (the biasing force assisting the movement of the wing tip device into the load alleviating configuration such that it is moved under the action of both the biasing force and aerodynamic forces. Having the restraining assembly in combination with this hinged wing tip device may be referred to as a "semi-aeroelastic" arrangement).

Having the biasing member may be beneficial in reducing flutter (for example in reducing the speed at which flutter may occur).

When the restraining assembly is in the restraining mode, the biasing force is preferably overcome by the restraining force. But, when the restraining assembly is in the releasing mode, the biasing force is preferably sufficient to assist in moving the wing tip device into the load alleviating configuration. In some embodiments, when the restraining assembly is in the releasing mode, the biasing force may be sufficient to move the wing tip device into the load alleviating configuration. Such an arrangement provides reassurance that the wing tip device can move to the load alleviating configuration, if needs be, even in the absence of aerodynamic forces acting on the wing tip device. Nevertheless, the wing tip device is more preferably arranged such that it may be moved from the flight configuration to the load alleviated configuration, at least partially by aerodynamic forces acting on the wing tip device.

The biasing member may be able to be selectively disengaged from exerting the biasing force on the wing tip device. For example, the wing may comprise a clutch for selectively disengaging the biasing member from exerting the biasing force on the wing tip device. Such an arrangement has been found to be beneficial because, it may enable the biasing member to be selectively disengaged to enable easier maintenance of the wing tip device.

In the restraining mode the wing tip device is held in the flight configuration using a restraining force. In the releasing mode it is that restraining force (which had been exerted to hold the device in the flight configuration) which is released. It will be appreciated that when the restraining assembly is in the releasing mode, this does not necessarily preclude there still being resistive forces per se present between the wing and wing tip device (for example from a damper).

The wing preferably comprises a damping system arranged to damp movement of the wing tip device. Such an arrangement has been found to be beneficial, especially when the wing tip device is quickly moved to the load alleviating configuration, as it tends to damp down transient, oscillatory, movements. A damping system has also been found to be beneficial because it may mitigate aeroelastic instabilities such as flutter, and/or may limit cycle oscillations.

In other embodiments, the aircraft need not comprise any damper and/or biasing member. Indeed, in some embodiments the wing tip device may be entirely free to rotate when the restraining assembly is in the releasing mode (i.e. there may be substantially no other resistive forces acting to prevent rotation once the restraining force is removed). When the wing tip device is free to rotate in this manner, it may be referred to as 'coasting' or being arranged to 'coast'. For some embodiments of the invention, having such an arrangement have been found to be especially beneficial. In such embodiments, the centre of gravity of the wing tip device may be positioned such that no substantive shear loads are passed into the wing tip and to ensure the flutter speed is sufficiently high.

The aircraft may further comprise a control system arranged to control operation of the restraining assembly between the restraining and the releasing modes. The control system may be part of the Electronic Flight Control System (EFCS).

The aircraft may comprise a detector for detecting when the restraining assembly should be switched from the restraining mode to the releasing mode. In some embodiments, the detector may be arranged to detect a force on the aircraft (for example a bending force in the wing). The control system may be configured to switch operation of the restraining assembly from the restraining mode to the releasing mode in response to the detected force exceeding a predetermined threshold The aircraft may comprises an alpha detector (also known as an Alpha vane, or angle of attack detector) for detecting the angle of attack of the aircraft relative to the freestream flow. The control system may be configured to switch operation of the restraining assembly from the restraining mode to the releasing mode in response to the detected angle of attack exceeding a predetermined threshold. Thus, the restraining assembly may be placed in the releasing mode when an event indicative of a high load is detected (for example a gust may be registered using the alpha detector).

The control system may be arranged to also control other load alleviating elements on the aircraft (for example elevators or ailerons) in response to the alpha detector. Such elements may provide complementary load alleviation to that provided by the moveable wing tip device.

The alpha detector may be located on the aircraft nose such that it is located upstream of the wing tip device. Locating the alpha detector upstream of the wing tip device has been found to be especially beneficial because it enables the event (for example the gust) to be detected prior to that event encountering the wing tip device. Thus the wing tip device may be allowed to adopt the load alleviating configuration before that event reaches it.

Load alleviation using embodiments of the invention has been found to be especially beneficial during low-speed operations (for example during take-off, climb, and/or landing). Due to system complexity, it tends to be difficult to integrate high-lift devices (such as slats) into a moveable wing tip device. The wing tip may therefore be prone to stall during low speed operations such as those indicated above. The present invention recognises that by moving the wing tip device to the load alleviating configuration, the onset of stall may be alleviated (thereby avoiding the associated drag rise). This may assist the aircraft in meeting low speed requirements, especially for take-off and climb. Thus, in some embodiments of the invention the control system may be configured to switch operation of the restraining assembly from the restraining mode to the releasing mode in response to a speed signal. The speed signal may indicate the aircraft is operating at low speed (for example the speed signal may indicate the speed is below a predetermined threshold.

In the load alleviating configuration, the load on the wing tip may be reduced, and in some embodiments it may be substantially eliminated. Such an arrangement has been found to be especially beneficial when the aircraft is undergoing roll. In particular, since the lift forces at the tips of the wings are alleviated, they tend not to act against (i.e. they tend not to damp) the rolling motion. This may enable the aircraft to be more responsive when undergoing roll (or as responsive as an aircraft with a correspondingly shorter wing span). Thus, in some embodiments of the invention the control system may be configured to switch operation of the restraining assembly from the restraining mode to the releasing mode in response to a roll signal. The roll signal may be indicative of the aircraft undergoing a roll manoeuvre (e.g. in response to oppositely actuated ailerons on either wing). Such an arrangement has been found to be especially beneficial in embodiments in which the wing tip device may 'coast' (for example where there is no biasing member and/or damper)

Some embodiments of the invention have been found to be beneficial in reducing the flutter speed. In particular, it has been found that in some embodiments, when the restraining assembly adopts the releasing mode, and the wing tip device is in the load alleviation configuration, the onset of flutter may be delayed. This is thought to be due to the flapping motion that the wing tip device may adopt when the restraining assembly is in the releasing mode. There is an EASA CS25 requirement that an aircraft is flutter free up to 115% times the dive speed (Vd) for a nominal condition or 100% times Vd for a failure condition. Some embodiments of the present invention may be used to assist in suppressing flutter in this region between Vd and 1.15 Vd. For example, the control system may be configured to switch operation of the restraining assembly from the restraining mode to the releasing mode in response to a speed signal indicating that the dive speed has been exceeded. Such an arrangement has been found to be especially beneficial in embodiments in which the wing tip device may 'coast' (for example where there is no biasing member and/or damper).

The aircraft may comprise a corresponding fixed wing, wing tip device and restraining assembly, on the other side of the aircraft fuselage. The control system may be configured to switch operation of one of the restraining assemblies from the restraining mode to the releasing mode in response to an input indicative of the other of the restraining assembles having already switched to the releasing mode. Such an arrangement is beneficial because it may prevent asymmetrical deployment of the wing tip device (for example in the event of an uncommanded switch of the restraining assembly to the releasing mode).

Embodiments of the invention are especially beneficial in arrangements in which the wing tip device is arranged to be moveable for both load alleviation, and for enabling a relatively large span in flight, yet a reduced span on ground to comply with airport gate limits. Thus, in some embodiments of the invention, the wing tip device may also be operable to (iii) a ground configuration for use during ground-based operations, in which ground configuration the wing tip device is moved away from the flight configuration such that the span of the aircraft wing is reduced. In the flight configuration, the span may exceed an airport compatibility gate limit. In the ground configuration the span is reduced such that the span (with the wing tip device in the ground configuration) is less than, or substantially equal to, the airport compatibility gate limit.

The aircraft preferably comprises an actuator arranged to move the wing tip device between the flight configuration and the ground configuration. The actuator may also be arranged to move the wing tip device from the load alleviating configuration back to the flight configuration. When the restraining assembly is in the restraining mode, the actuator may be in a passive state such that it does not actively contribute to the restraining force. Such embodiments of the invention have been found to be beneficial because they enable the function of restraining of the wing tip device (during flight) to be de-coupled from the function of the actuator (which may be reserved for moving the wing tip device between the flight and ground configurations).

The actuator may be a motor, for example an electric motor. The actuator may be a hydraulic actuator.

The restraining assembly may be associated with a fuse, preferably a mechanical fuse. The restraining assembly may be arranged such that failure of the fuse results in the restraining assembly adopting the releasing configuration. The fuse may be arranged to fail is response to the load on the wing tip device exceeding a threshold level. The threshold level is preferably above the load that would otherwise overcome the restraining force. In other words, the fuse is preferably arranged to fail in response to excessive loads on the wing tip device, as may occur if the restraining assembly fails to adopt the releasing configuration.

The aircraft may comprise a latching arrangement for holding the wing tip device in the load alleviating configuration. For example, the aircraft may comprise a ratchet and pawl configured to allow rotation of the wing tip device to the load alleviating configuration, and to then hold it in that configuration unless or until it is to be reverted to the flight configuration. Such an arrangement may be especially beneficial in embodiments in which there is no biasing member and/or damper because it enables the wing tip device to be 'caught' in the load alleviating configuration (once it has moved under aeroelastic forces once the restraining assembly is in the releasing configuration). The latching arrangement may be controlled by a control unit to latch and/or release the wing tip device.

The wing tip device may be rotatably mounted on a hinge at the tip of the wing, such that it may rotate, about the hinge, between the flight and load alleviating configurations. In embodiments in which the wing tip device is also moveable to the ground configuration, the wing tip device is preferably so moveable about this same hinge.

The hinge is preferably orientated non-parallel to the line-of flight direction. The hinge is preferably orientated such that the hinge at the trailing edge of the wing is further inboard than the hinge at the leading edge of the wing. The hinge is preferably orientated such that in the load alleviating configuration, the mean incidence of the wing tip device is reduced. The hinge is preferably orientated substantially perpendicular to the swept mean chord axis of the wing. The swept mean chord axis may be parallel to the longitudinal direction of the wing box. Such an arrangement has been found to be beneficial in terms of enabling a load reduction (in comparison with a hinge line that is orientated parallel to the line-of flight). Furthermore, such an orientation of hinge has been found to facilitate movement of the wing tip device to a stable load alleviating configuration. For example, when the hinge is in such an orientation, the wing tip device tends to move to a static-aeroelastically stable position even under purely aerodynamic loading. This orientation of hinge is therefore especially beneficial in combination with the restraining assembly in embodiments of the invention. The orientation of the hinge may be chosen such that it acts to stabilise flutter.

The wing tip device may be rotatable, from the flight configuration to the load alleviating configuration, in an upwards direction. The wing tip device may be rotatable, from the flight configuration to the load alleviating configuration, in a downwards direction. The hinge may be a double hinge enabling both upwards or downward rotation. Providing such a double hinge has been found to be beneficial because it may enable loads from both upwards and downwards events (such as gusts) to be alleviated. Such an arrangement may also ensure the load alleviating configuration does not inadvertently amplify loads, as might otherwise occur if the wing tip device is allowed to adopt this configuration in response to an event in the opposite direction to that intended.

The wing tip device may be a wing tip extension; for example the wing tip device may be a planar tip extension. In other embodiments, the wing tip device may comprise, or consist of, a non-planar device, such as a winglet.

In the flight configuration the trailing edge of the wing tip device is preferably a continuation of the trailing edge of the fixed wing. The leading edge of the wing tip device is preferably a continuation of the leading edge of the fixed wing. There is preferably a smooth transition from the fixed wing to the wing tip device. It will be appreciated that there may be a smooth transition, even where there are changes in sweep or twist at the junction between the fixed wing and wing tip device. However, there are preferably no discontinuities at the junction between the inner wing and wing tip device.

When the wing tip device is in the load alleviating configuration, the aircraft incorporating the wing, is still suitable for flight, but the wing tip device is preferably moved to a position in which the load on the wing is alleviated. It will be appreciated that the load alleviating configuration may encompass the wing tip device being in a range of positions (all of which alleviate load to some degree). The position (for example the magnitude of rotation about the hinge) may be dependent on the magnitude of load that is sought to be alleviated. In the load alleviating configuration the wing tip device remains attached to the fixed wing. The wing tip device may be repeatably moveable between the load alleviating configuration and the flight configuration.

In embodiments in which the wing tip device is moveable to the ground configuration, the aircraft incorporating the wing, when the wing tip device is in the ground configuration, may be unsuitable for flight. For example, the wing tip device may be aerodynamically and/or structurally unsuitable for flight in the ground configuration. The aircraft is preferably configured such that, during flight, the wing tip device is not moveable to the ground configuration. The aircraft may comprise a sensor for sensing when the aircraft is in flight. When the sensor senses that the aircraft is in flight, a control system is preferably arranged to disable the possibility of moving the wing tip device to the ground configuration. In the ground configuration, the wing tip device may be rotated about the hinge by an angle greater than the maximum angle about which it is rotated in the load alleviating configuration. In the ground configuration the wing tip device remains attached to the wing.

The aircraft is preferably a passenger aircraft. The passenger aircraft preferably comprises a passenger cabin comprising a plurality of rows and columns of seat units for accommodating a multiplicity of passengers. The aircraft may have a capacity of at least 20, more preferably at least 50 passengers, and more preferably more than 50 passengers. The aircraft is preferably a powered aircraft. The aircraft preferably comprises an engine for propelling the aircraft. The aircraft may comprise wing-mounted, and preferably underwing, engines.

According to another aspect of the invention, there is provided an aircraft wing for use as the wing in any preceding claim, the wing comprising a fixed wing with a wing tip device moveably mounted at the tip thereof, wherein the fixed wing has an upper surface and a lower surface, and the wing tip device has an upper surface and a lower surface, and the wing tip device is operable between:
(i) a flight configuration for use during flight, in which configuration the upper and lower surfaces of the wing tip device are continuations of the upper and lower surfaces of the fixed wing; and (ii) a load alleviating configuration for load alleviation during flight, in which configuration the wing tip device is moved relative to the fixed wing such that at least one of the upper and lower surfaces of the wing tip device is moved away from the respective surface of the fixed wing, and the load on the wing is reduced; characterised in that the wing comprises a restraining assembly operable between a restraining mode in which the wing tip device is held in the flight configuration using a restraining force, and a releasing mode in which the restraining force on the wing tip device is released, such that the wing tip device may adopt the load alleviating configuration.

According to another aspect of the invention, there is provided a restraining assembly for use as the restraining assembly of any preceding claim, the restraining assembly being arranged to be installed on an aircraft wing, and being operable between a restraining mode in which a wing tip device is held in the flight configuration using a restraining force, and a releasing mode in which the restraining force on the wing tip device is released, such that the wing tip device is able to adopt a load alleviating configuration.

According to another aspect of the invention, there is provided a method of controlling load alleviation on a wing having a fixed wing with a wing tip device moveably mounted at the tip thereof, the method comprising the steps of: (a) holding the wing tip device in a flight configuration using a restraining force, in which flight configuration the upper and lower surfaces of the wing tip device are continuations of the upper and lower surfaces of the fixed wing; and (b) releasing the restraining force to allow the wing tip device to adopt a load alleviating configuration for load alleviation during flight, in which configuration the wing tip device is moved relative to the fixed wing such that at least one of the upper and lower surfaces of the wing tip device is move away from the respective surface of the fixed wing, and the load on the wing is reduced.

The method of the above-mentioned aspect of the invention, may comprise the step of effecting a roll manoeuvre when the restraining assembly is in the releasing mode. The method may be conducted at low speed, where the ability to achieve the maximum roll rate tends to be most challenging (compared to higher speed where maximum roll rate is less problematic and achieving suitable drag performance is of higher priority). It will be appreciated that any features described with reference to one aspect of the invention are equally applicable to any other aspect of the invention, and vice versa. For example features described with reference to the aircraft of the first aspect may also be applicable to the wing, restraining assembly and/or method of the other aspects of the invention.

DESCRIPTION OF THE DRAWINGS

Embodiments of the present invention will now be described by way of example only with reference to the accompanying schematic drawings of which:

FIG. 1b shows a close-up view of the tip of the wing of the aircraft in FIG. 1a;

FIGS. 2b-d show a plan view of the aircraft of FIG. 2a with the wing tip device in respective close-up views;

DETAILED DESCRIPTION

Figure 1A:
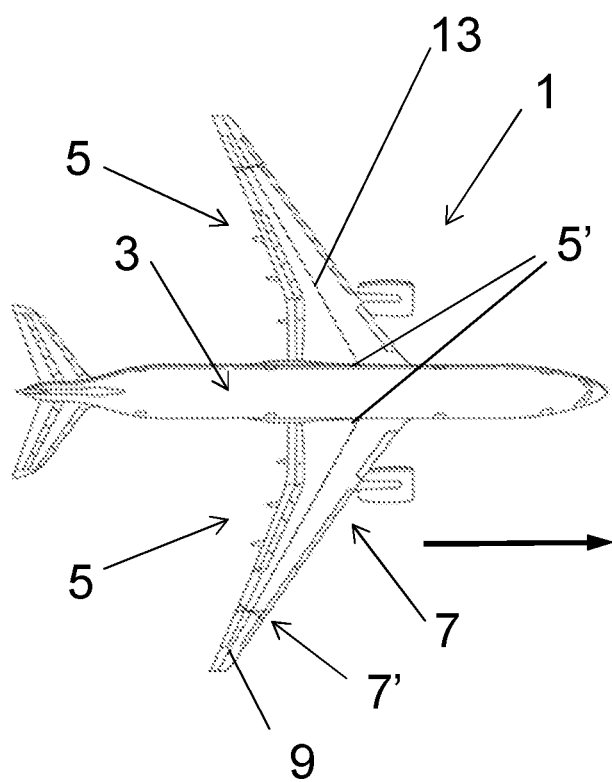
FIG. 1a shows a plan view of an aircraft according to a first embodiment of the invention.

FIG. 1a is a plan view of an aircraft 1 according to a first embodiment of the invention. The aircraft comprises a central fuselage 3 and two main wings 5 extending outwardly from respective wing roots 5'.

Figure 1B:
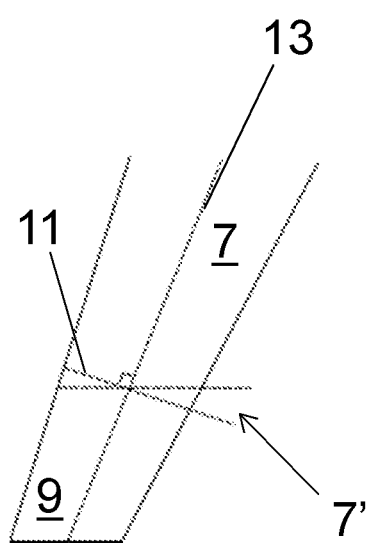

Each wing 5 comprises a fixed wing 7 extending from the root 5' to the tip 7' (shown in close up in FIG. 1b). At the tip 7' of the fixed wing 7, the wing 5 also comprises a moveable wing tip device 9, in the form of a planar wing tip extension. The wing tip device 9 is rotatable mounted about a hinge 11 that is orientated perpendicular to the swept mid-chord axis 13. This hinge 11, is thus non-parallel to the line of flight direction (the line of flight direction being shown in FIG. 1b for comparison).

Referring now to FIGS. 2a to 2d, the wing tip device 9 is rotatable about the hinge 11 from a flight configuration to a load alleviating configuration.

In the flight configuration, the wing tip device 9 is an extension of the fixed wing. Accordingly the upper and lower surfaces of the fixed wing 5 are continuous with the upper and lower surfaces of the wing tip device 9 (see FIG. 2b and the lowermost position in FIG. 2a). The leading and trailing edges of the fixed wing 5 are also continuous with the respective leading and trailing edges of the wing tip device 9 (see FIGS. 1a and 1b). Such an arrangement is beneficial as it provides a relatively large wing span, thereby providing an aerodynamically efficient aircraft. However a large span can result in correspondingly large loads on the wing 5, particularly a large wing root bending moment, especially during high load events such a gusts or extreme manoeuvres. The wing 5 must be sized to cope with these maximum loads, which can result in a relatively heavy wing. In the first embodiment of the invention, the ability of the wing tip device 9 to move to the load alleviating configuration (see FIGS. 2a and 2c) seeks to address that problem.

Figure 2A:
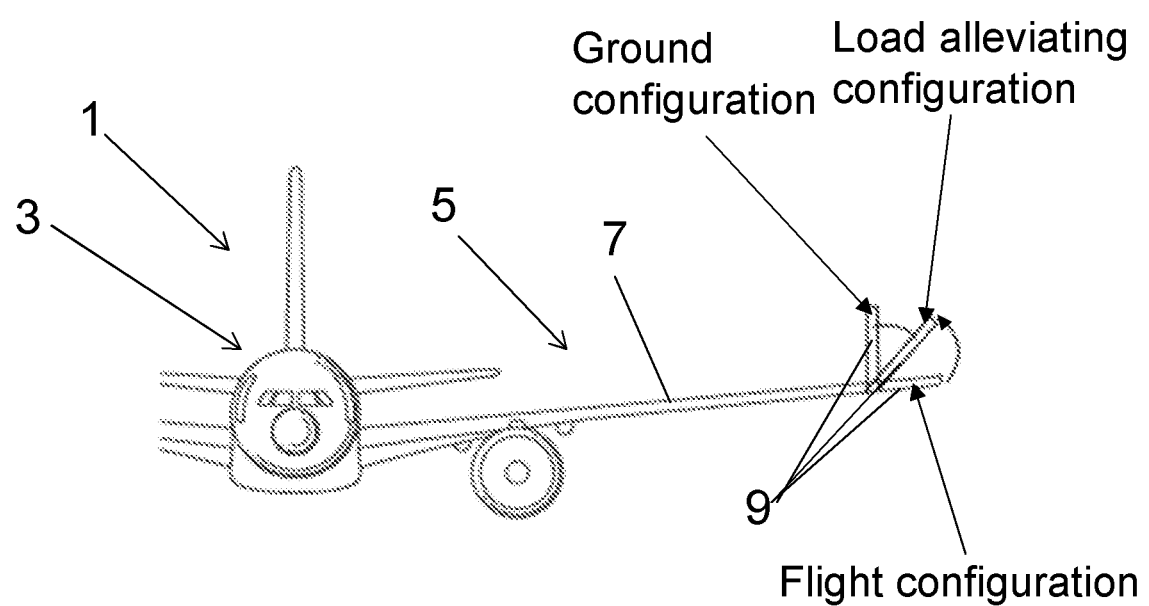
FIG. 2a shows a front view of the aircraft of FIG. 1a with the wing tip device is both a flight configuration and the load alleviating configuration, and a ground configuration.

As shown in FIG. 2c and the middle position in FIG. 2a, the wing tip device 9 is rotatable, upwards, such that the lower surfaces between the fixed wing 7 and the wing tip device 9, are no longer continuous with one another. Furthermore, since the hinge 11 is angled with respect to the streamwise direction, when the wing tip device 9 rotates upwardly its mean incidence is reduced. In this configuration the loads on the wing 5, generated by the wing tip device 9, are significantly reduced. The wing tip device 9 is moveable to this configuration during flight (described in more detail below). By providing this load alleviation function during flight, the maximum load the wing needs to be designed for may be reduced, and thus the wing 5 can be made relatively lightweight.

The wing tip device 9 is also configurable to a ground configuration in which the wing tip device 9 is rotated yet further, to a substantially upright position (shown in FIG. 2d and the upright position in FIG. 2a). The wing tip device is moveable to this configuration when it is on the ground (described in more detail below). Once rotated to such a position, the span of the aircraft 1 is sufficient to meet airport compatibility gate limits. Thus, the aircraft 1 of the first embodiment can have a large span (exceeding gate limits) during flight, but is still able to comply with gate limits when on the ground.

Load alleviation using moveable wing tip devices is known per se. Providing moveable wing tip device to meet airport compatibility gate limits is also known per se. The first embodiment of the invention combines both those functions in a symbiotic way. Furthermore, the first embodiment provides a novel restraining assembly to enable such movement as will now be described with reference to FIG. 3.

Figure 3:
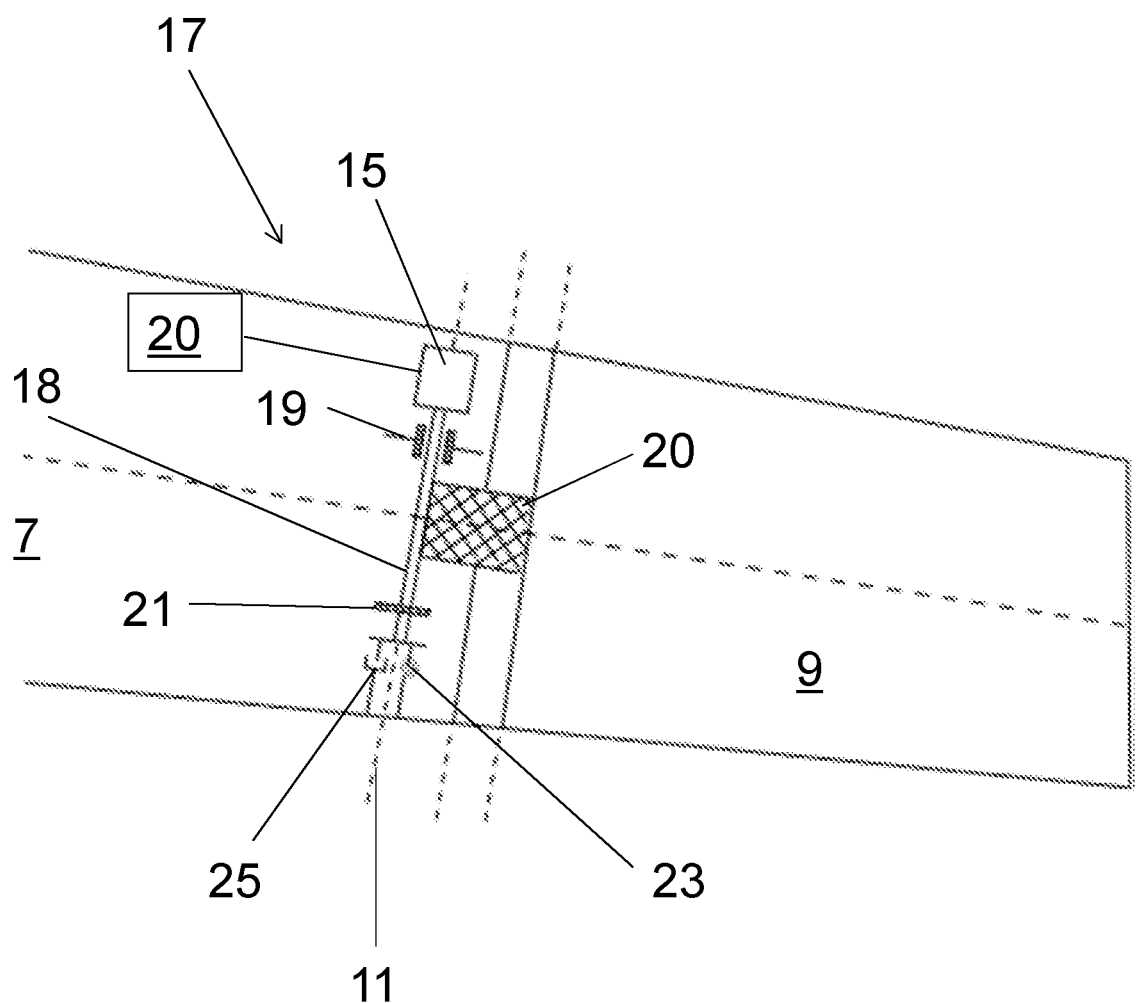
FIG. 3 shows a close-up of the tip of the wing of the aircraft of FIG. 1a, together with the restraining assembly.

Referring to FIG. 3, the aircraft 1 comprises a motor 15 connected to a drive shaft 18 that forms the shaft of the hinge 11. The wing tip device 9 is connected to the shaft 18 by a connecting piece 20. The motor 15 is arranged to rotate the wing tip device 9 between the flight configuration (see FIG. 2b) and the ground configuration (see FIG. 2d) by actuation of the motor 15. This typically occurs shortly after landing to enable the aircraft to comply with airport gate limits. This movement also happens in reverse before take-off, once the aircraft has cleared the gate.

When the aircraft is flying and the wing tip device is in the flight configuration, there tends to be a significant force on the wing tip (typically upwards). It has been recognised that using the motor 15 to actively hold down the wing tip device in the flight configuration, by applying a reverse torque, is undesirable; if using such an approach it would typically be necessary to also provide locks to permanently lock the wing tip device in that flight position during flight.

In the first embodiment, the motor 15 does not provide a reverse torque. Instead it is in a passive state such that it does not actively contribute to restraining the wing tip device 9 in the flight configuration. The aircraft 1 is instead provided with a restraining assembly 17.

The restraining assembly 17 comprises a brake 19, a clutch 21, a rotational spring 23 and a rotational damper 25, and will not be described in more detail.

The brake 19 comprises two pads configured to selectively clamp against the shaft 18 to restrain its rotation. The restraining assembly 17 is operable between a restraining mode (in which the brake 19 is deployed to brake the rotation of the shaft 18), and a releasing mode (in which the brake 19 is released by pulling the pads away from the shaft 18 to allow its free rotation (and thus the rotation of the wing tip device 9)).

The default (passive) mode of the restraining assembly 17 is the restraining mode in which the shaft 18 is braked. When the wing tip device 9 is in the flight configuration, the power to the restraining assembly 17 is switched OFF (i.e. the assembly is passive) and the restraining assembly 17 is left with the shaft 18 braked. Such an arrangement is attractive as it ensures an active command (e.g. an ON signal) is required to move the wing tip device)

The restraining assembly 17, including the brake 19, is controlled by a control module 20 of the Electronic Flight Control System (EFCS). The control module 20 is shown as a box in the schematic of FIG. 3.

The module 20 is configured to receive a measurement of the local angle of attack from an alpha vane (not shown) on the nose of the aircraft 1. During cruise flight, the restraining assembly 17 is OFF and the brake is braked onto the shaft 18. However, when the measurement from the alpha detector indicates an oncoming gust (i.e. a significant change in angle of attack) the control module 20 switches the restraining assembly ON, which releases the brake 19.

Such an arrangement enables the wing tip device 9 to be securely held in the flight configuration during normal cruise flight, but by switching the releasing assembly ON to release the brake 19, the wing tip device 9 is movable quickly to the load alleviating configuration. This means the wing can avoid being subjected to high gust loadings. This in turn may enable the wing 5 to have a relatively large span, without necessarily having to incur the associated weight penalty, because it can be designed for a lower magnitude of maximum load.

The wing tip device 9 may, at least partially, be moveable to the load alleviating configuration purely under the action of aerodynamic force acting on it during flight, or under the gust loads. However, in the first embodiment of the invention, the restraining assembly comprises a rotational spring 23 and damper 25 arrangement to assist this movement. The rotational spring 23 and damper 25 are located at one end of the hinge 11. The rotational spring 23 is preloaded such that when the wing tip device 9 is in the flight configuration, it exerts a biasing force that urges the wing tip device 9 towards the load alleviating configuration. That biasing force is unable to overcome the restraining force exerted by the brake 19 when it is deployed. However, when the brake 19 is released, the biasing force (in addition to aerodynamic forces acting on the wing tip device) acts to rotate the wing tip device 9 about the hinge 11. The rotational spring 23 is sized such that it rotates the wing tip device 9 by around 30 degrees of rotation (shown in FIG. 2c), but once the wing tip device 9 has rotated that far, the spring 23 is fully unwound and does not urge any further rotation. Providing a preloaded spring 23 in this manner has been found to be beneficial as it quickly moves the wing tip device 9 to the load alleviated configuration, as soon as the brake 19 has been released.

The damper 25 is configured to damp movement of the wing tip device 9 as it rotates under the action of the spring 23 (and any aerodynamic forces). Such an arrangement has been found to be beneficial, especially when the wing tip device 9 is quickly moved to the load alleviating configuration, as it tends to damp down transient, oscillatory, movements. The spring damper system may also assist in reducing or eliminating flutter and/or load cycle oscillations.

The restraining assembly also comprises a clutch 21 located on the hinge 11. The clutch 21 serves to selectively engage/disengage opposing ends of the hinge, such that the spring 23 can be selectively chosen to exert the biasing force on the wing tip device 9. Such an arrangement has been found to be beneficial because it may enable the spring 23 to be selectively disengaged to enable easier maintenance of the wing tip device 9.

As mentioned above, when the wing tip device 9 is in the flight configuration, the, the motor 15 is in a passive state such that it does not actively contribute to restraining the wing tip device 9 in the flight configuration (except for resistance as a result of rotational inertia). When the wing tip device has been moved to the load alleviating configuration, the motor 15 may, however, be activated such that it rotates the wing tip device 9 back to the flight configuration and re-compresses the spring 23. Once in that position, the restraining assembly is switched back into restraining mode such that the brake is applied, and the motor is again returned to its passive state. Thus the motor can be used not only to move the wing tip device between the flight and ground configurations, but also from the load alleviating configuration to the flight configuration (albeit not from the flight configuration to the load alleviating configuration).

Figure 4:
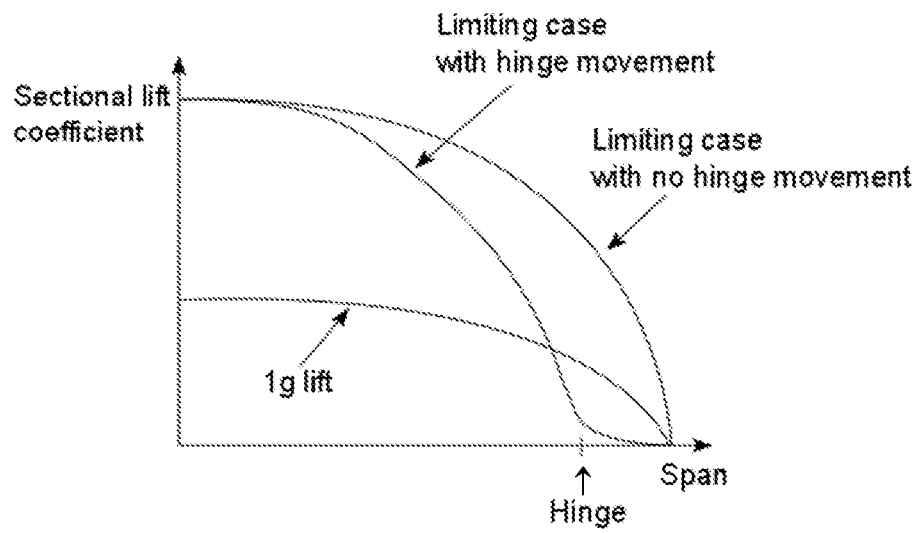
FIG. 4 is a graph showing the lift distribution across the wing of the aircraft of FIG. 1a during 1g cruise and max gust conditions, and the lift distribution of the equivalent aircraft not having the moveable wing tip device of the first embodiment, during max gust conditions.

The advantages of the present invention with respect to wing loading, will now be explained with reference to FIGS. 4 to 6:

FIG. 4 is a graph showing the variation in lift coefficient (Y-axis) across the span on the wing (x-axis) during the flight configuration in 1g cruise flight, and during a gust with the wing tip device in the load alleviating configuration. For comparison, the graph also shows the variation in lift coefficient for a notional wing with the wing tip device being fixed (i.e. effectively remaining in the flight configuration) during that gust.

Figure 5:
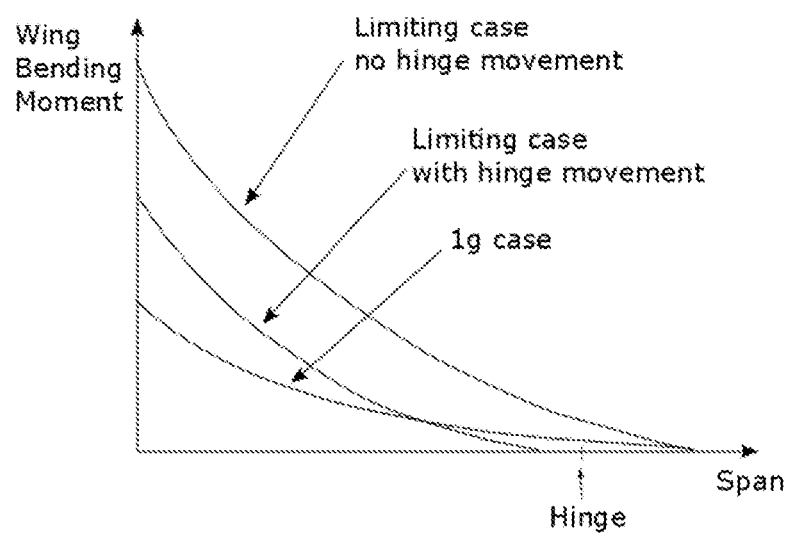
FIG. 5 is a graph showing the wing root bending moment of the aircraft of FIG. 1a during 1g cruise and max gust conditions, and the wing root bending moment of the equivalent aircraft not having the moveable wing tip device of the first embodiment, during max gust conditions.

FIG. 5 is a graph showing the variation in wing bending moment (Y-axis) across the span on the wing (x-axis) during the flight configuration in 1g cruise flight, and during a gust with the wing tip device in the load alleviating configuration. For comparison, the graph also shows the variation in wing bending moment for a notional wing with the wing tip device being fixed (i.e. effectively remaining in the flight configuration) during that gust.

As can be seen by comparing the behaviour during a gust with the wing tip device in the load alleviating configuration, or fixed in the flight configuration, the load alleviation enables the lift on the wing to be much reduced in the vicinity of the tip and beyond the wing tip device (the hinge line 11 is marked on the x-axis). This results in a corresponding decrease in wing bending moment (including a reduction in the wing root bending moment).

Figure 6:
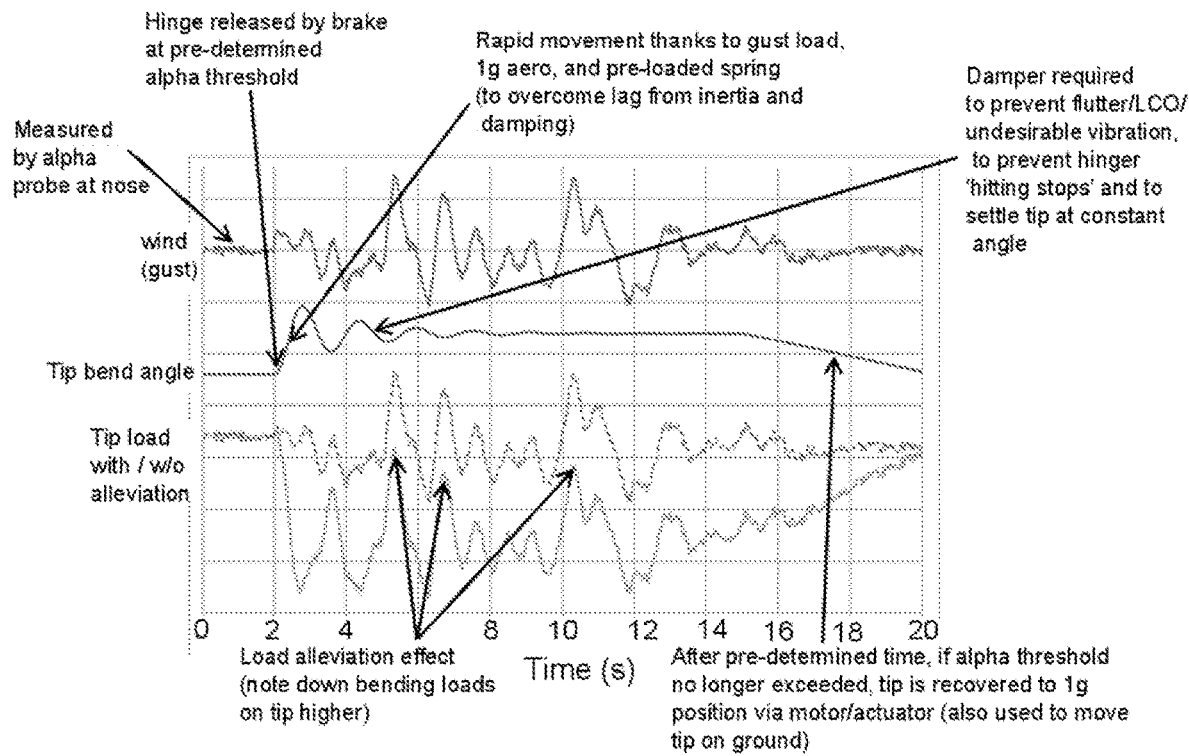
FIG. 6 is a graph showing the behaviour of the wing tip device in the aircraft of FIG. 1a during gust conditions, and the behaviour of the equivalent aircraft not having the moveable wing tip device of the first embodiment.

FIG. 6 shows four sets of data. The top line shows the variation in alpha detected by the alpha vane at the nose of the aircraft over time (x-axis). This can be thought of as a measure of the magnitude of gusts experienced by the aircraft.

The second line from the top shows the angle of the wing tip device away from the flight configuration when it is configured in the load alleviating configuration.

The bottom two lines show the estimated wing tip loadings over time for an embodiment in which the wing tip device is moved to the load alleviating configuration (bottom-solid line) and a notional wing with the wing tip device being fixed (i.e. effectively remaining in the flight configuration) during that gust (dashed line).

As can be seen from FIG. 6, at t=2, the aircraft encounters an upward gust. The gust exceeds a predetermined threshold magnitude (stored a memory device of the control module 20). In response to the gust, the restraining assembly 17 is switched from the restraining mode to the releasing mode. In doing so, the brake 19 is released from the hinge shaft 18 such that the wing tip device 9 is free to rotate upwardly. Under the action of the spring 23 and the aerodynamic forces of the gust, the wing tip devices rotates upwardly about the hinge to a maximum angle at around t=3.

The damper 25 acts to damp out flutter or other oscillatory movement, such that between t=3 and t=8 the rotation of the wing tip device settles down and adopts a fixed angle of around 30 degrees from the flight configuration. In this configuration the upward loads experienced by the wingtip are considerably lower than would occur if the wing tip device were fixed (see bottom two lines of graph). Whilst the downward loads are actually higher than would be experienced with the fixed wing tip, this is less of an issue as the wing is typically sized to cope with max upward loadings.

After t=16, the gusts return below the threshold level. As such, the control system switches on the motor 15, which then pulls the wing tip device back down and re-loads the spring 23. At t=20, the wing tip device has returned to the flight configuration. Accordingly, the control module 20 switches the restraining assembly back to restraining mode, such that the hinge shaft 18 is braked, and the motor 15 is switched off.

Figure 7:
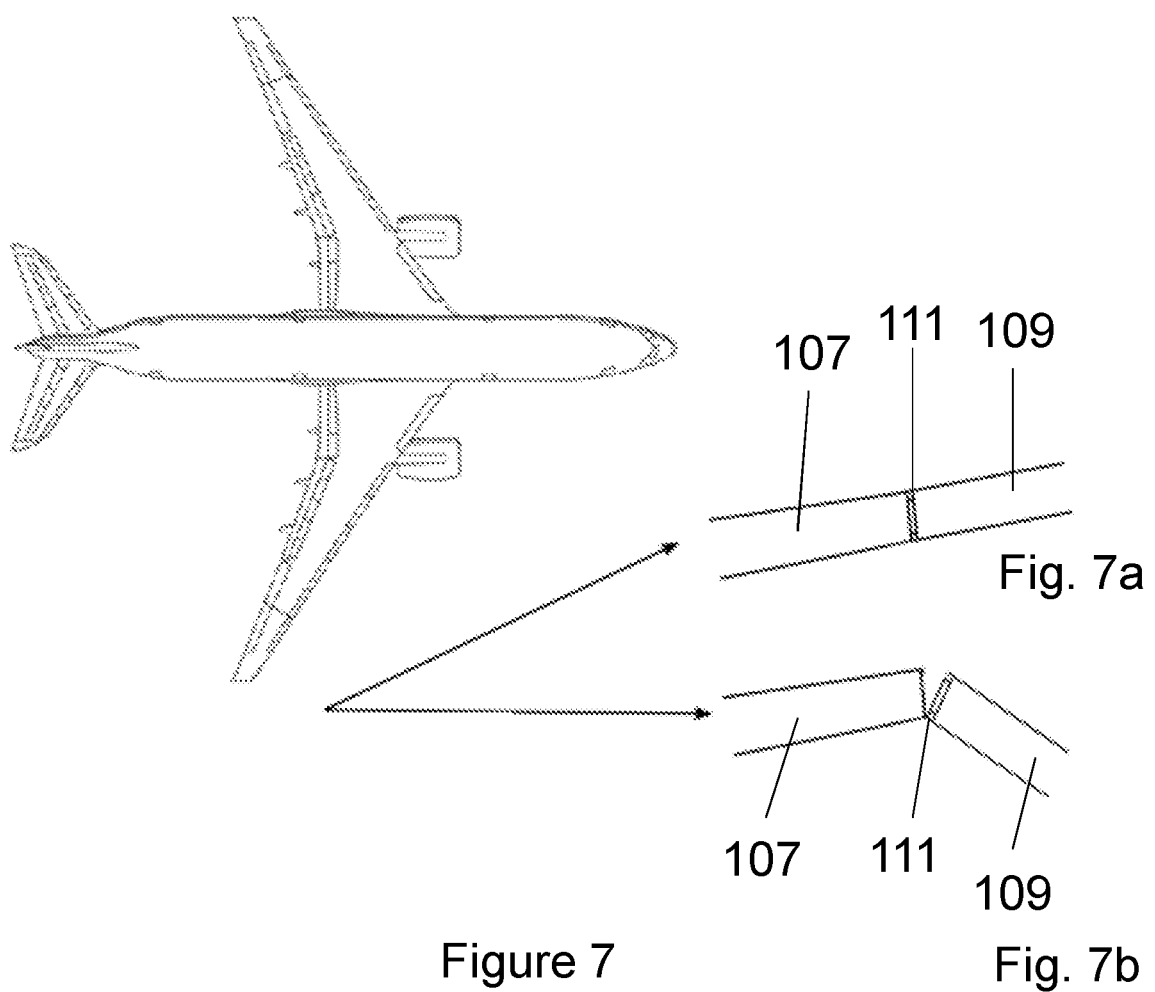
FIG. 7 shows an alternative embodiment with a double hinge, which allows for upward and downward rotation of the wing tip device.

In an alternative embodiment, as shown in FIG. 7, the hinge 111 may be a double hinge for allowing both upward and downward rotation of the wing tip device 109 to the load alleviating configuration (only the downward rotation being illustrated in FIG. 7, and the upward rotation being as per FIG. 2c of the first embodiment). Such an arrangement enables both positive-g and negative-g loads to be alleviated.

Figure 8:
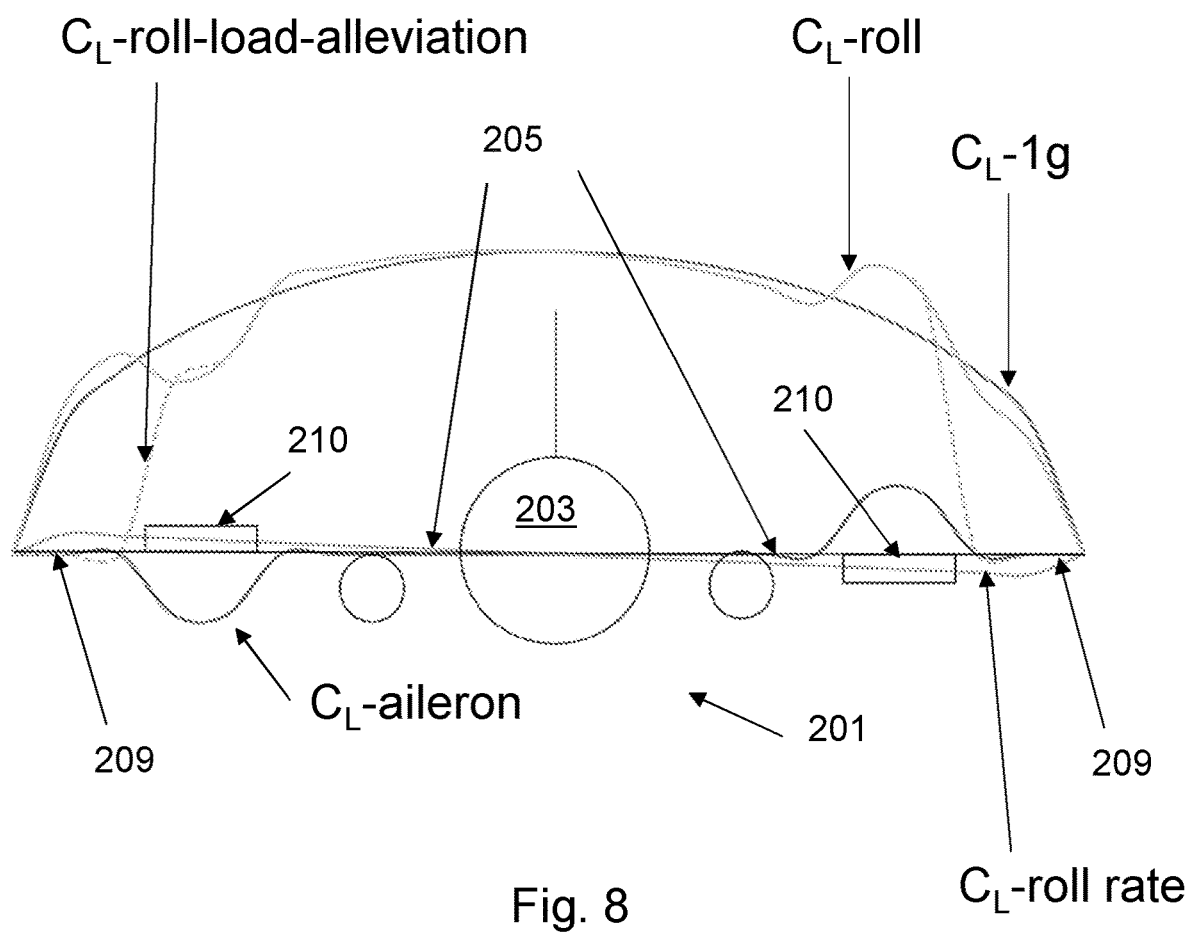
FIG. 8 is a schematic front view showing different contributors to the lift distribution across the span of an aircraft of a third embodiment of the invention.

A third embodiment of the invention is shown schematically in FIG. 8. The third embodiment is identical to the first embodiment except for the features described below. Features in the third embodiment of the invention that correspond to similar features in the first embodiment of the invention, are shown with the same reference numerals as in the first embodiment, but with the addition of the prefix '2' (or '20' where appropriate).

FIG. 8 is a schematic front view of the aircraft 201, having a fuselage 203 and wings 205. Each wing 205 has a wing tip device 209 that is moveable from a flight configuration in which it is held in the plane of the wing, and a load alleviating configuration in which it is free to move to alleviate loads. The mechanism and control system is as shown in FIG. 3 (for the first embodiment) except that the spring and damper are not present. Thus, when the brake is released the wing tip devices 209 are free to rotate about their hinge line (in a so-called 'coasting' arrangement).

In the third embodiment, the restraining assembly adopts the releasing mode during a role manoeuvre in order to mitigate the roll damping effect caused by the wing tips. This is visible from FIG. 8: Line $C_L$-1g represents the 1g-flight lift distribution with the restraining assembling in restraining mode and the wing tip device in the flight configuration. Line $C_L$-roll represents the lift distribution with the restraining assembling in restraining mode and the wing tip device in the flight configuration, but with the ailerons 210 actuated in opposite directions to effect a roll manoeuvre. Line $C_L$-aileron represents the lift distribution caused by the ailerons 210. Dotted line $C_L$-roll-load-alleviation represents the lift distribution with the restraining assembling in releasing mode and the wing tip device in the load alleviating configuration. Line $C_L$-roll-rate represents the change in lift coefficient caused by the local roll-rate along the wing.

As can be seen from a comparison of the lines $C_L$-roll and $C_L$-roll-load-alleviation, the lift outboard of the ailerons is substantially removed once the tips are in the load alleviated configuration. This causes the overall lift distribution to be restricted inboard and any roll damping effect from the load on the tips is largely removed.

In the second embodiment of the invention, the control module of the Electronic Flight Control System (EFCS) places the restraining assembly into the releasing mode when it detects that a roll is being performed (for example in response to opposing movements of the ailerons 210). The control module of the EFCS is also arranged to receive a signal relating to the speed of the aircraft and when the aircraft is at a relatively low speed (e.g. during climb).

Whilst the present invention has been described and illustrated with reference to particular embodiments, it will be appreciated by those of ordinary skill in the art that the invention lends itself to many different variations not specifically illustrated herein. By way of example only, in other embodiments (not shown) the wing tip device may comprises a hydraulic actuator for actuating the wing tip device between the flight and ground configurations. In that case, the hydraulics may also act as a damper when the wing tip device is in the load alleviating configuration.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An aircraft comprising a wing, the wing having a fixed wing with a wing tip device moveably mounted at the tip thereof, wherein the fixed wing has an upper surface and a lower surface, and the wing tip device has an upper surface and a lower surface, and the wing tip device is operable between:
   (i) a flight configuration for use during flight, in which configuration the upper and lower surfaces of the wing tip device are continuations of the upper and lower surfaces of the fixed wing; and
   (ii) a load alleviating configuration for load alleviation during flight, in which configuration the wing tip device is moved relative to the fixed wing such that at least one of the upper and lower surfaces of the wing tip device is moved away from the respective surface of the fixed wing, and the load on the wing is reduced; wherein the aircraft comprises
   an actuator arranged to move the wing tip device between the flight configuration and the ground configuration, and
   a restraining assembly operable between
      a restraining mode in which the wing tip device is held in the flight configuration using a restraining force, and
      a releasing mode in which the restraining force on the wing tip device is released, such that the wing tip device is able to adopt the load alleviating configuration.

2. An aircraft according to claim 1, wherein the wing comprises a biasing member, arranged such that when the wing tip device is in the flight configuration, the biasing member exerts a biasing force to urge the wing tip device towards the load alleviating configuration.

3. An aircraft according to claim 2, wherein when the restraining assembly is in the restraining mode, the biasing force is overcome by the restraining force, but when the restraining assembly is in the releasing mode, the biasing force is sufficient to assist in moving the wing tip device into the load alleviating configuration.

4. An aircraft according to claim 3, wherein the biasing member is able to be selectively disengaged from exerting the biasing force on the wing tip device.

5. An aircraft according to claim 4, wherein the wing comprises a clutch for selectively disengaging the biasing member from exerting the biasing force on the wing tip device.

6. An aircraft according to claim 1, further comprising a control system arranged to control operation of the restraining assembly between the restraining and the releasing modes.

7. An aircraft according to claim 6, wherein the aircraft comprises an alpha detector for detecting the angle of attack of the aircraft relative to the freestream flow, and wherein the control system is configured to switch operation of the restraining assembly from the restraining mode to the releasing mode in response to the detected angle of attack exceeding a predetermined threshold.

8. An aircraft according to claim 7, wherein the alpha detector is located on the aircraft nose such that it is located upstream of the wing tip device.

9. An aircraft according to claim 6, wherein the control system is configured to switch operation of the restraining assembly from the restraining mode to the releasing mode in response to an input indicative of the aircraft being in the landing and/or take-off phases.

10. An aircraft according to claim 6, wherein the aircraft comprises a corresponding fixed wing, wing tip device and restraining assembly, on the other side of the aircraft fuselage, and wherein the control system is configured to switch operation of one of the restraining assemblies from the restraining mode to the releasing mode in response to an input indicative of the other of the restraining assembles having already switched to the releasing mode.

11. An aircraft according to claim 1, wherein the wing tip device is also operable to
   (iii) a ground configuration for use during ground-based operations, in which ground configuration the wing tip device is moved away from the flight configuration such that the span of the aircraft wing is reduced.

12. An aircraft according to claim 1, wherein the actuator is also arranged to move the wing tip device from the load alleviating configuration back to the flight configuration.

13. An aircraft according to claim 1, wherein when the restraining assembly is in the restraining mode, the actuator is in a passive state such that it does not actively contribute to the restraining force.

14. An aircraft according to claim 1, wherein the wing tip device is rotatably mounted on a hinge at the tip of the wing, such that it may rotate, about the hinge, between the flight and load alleviating configurations.

15. An aircraft according to claim 14, wherein the hinge is orientated non-parallel to the line-of flight direction.

16. An aircraft according to claim 15, wherein the hinge is orientated substantially perpendicular to the swept mean chord axis of the wing.

17. An aircraft according to claim 14, wherein the hinge is a double hinge for allowing upwards and downwards rotation of the wing tip device.

18. A restraining assembly configured to be installed on an aircraft wing for the aircraft according to claim 1, and being operable between a restraining mode in which a wing tip device is held in the flight configuration using a restraining force, and a releasing mode in which the restraining force on the wing tip device is released, such that the wing tip device is able to adopt a load alleviating configuration.

19. An aircraft wing, comprising:
   a fixed wing with a wing tip device moveably mounted at the tip thereof, wherein the fixed wing has an upper surface and a lower surface, and the wing tip device has an upper surface and a lower surface, and the wing tip device is operable between:
   (i) a flight configuration for use during flight, in which configuration the upper and lower surfaces of the wing tip device are continuations of the upper and lower surfaces of the fixed wing; and
   (ii) a load alleviating configuration for load alleviation during flight, in which configuration the wing tip device is moved relative to the fixed wing such that at least one of the upper and lower surfaces of the wing tip device is moved away from the respective surface of the fixed wing, and the load on the wing is reduced;
   wherein the wing comprises
      an actuator arranged to move the wing tip device between the flight configuration and the ground configuration, and
      a restraining assembly operable between
         a restraining mode in which the wing tip device is held in the flight configuration using a restraining force, and
         a releasing mode in which the restraining force on the wing tip device is released, such that the wing tip device may adopt the load alleviating configuration.

20. A method of controlling load alleviation on a wing having a fixed wing with a wing tip device moveably mounted at the tip thereof, wherein wing has an upper surface and a lower surface, and the wing tip device has an upper surface and a lower surface, and an actuator arranged to move the wing tip device between the flight configuration and the ground configuration, the method comprising the steps of:
   (a) holding the wing tip device in a flight configuration using a restraining force, in which flight configuration the upper and lower surfaces of the wing tip device are continuations of the upper and lower surfaces of the fixed wing; and
   (b) releasing the restraining force to allow the wing tip device to adopt a load alleviating configuration for load alleviation during flight, in which configuration the wing tip device is moved relative to the fixed wing such that at least one of the upper and lower surfaces of the wing tip device is move away from the respective surface of the fixed wing, and the load on the wing is reduced.

21. An aircraft comprising a wing, the wing having a fixed wing with a wing tip device moveably mounted at the tip thereof, wherein the fixed wing has an upper surface and a lower surface, and the wing tip device has an upper surface and a lower surface, and the wing tip device is operable between:
   (i) a flight configuration for use during flight, in which configuration the upper and lower surfaces of the wing tip device are continuations of the upper and lower surfaces of the fixed wing; and
   (ii) a load alleviating configuration for load alleviation during flight, in which configuration the wing tip device is moved relative to the fixed wing such that at least one of the upper and lower surfaces of the wing tip device is moved away from the respective surface of the fixed wing, and the load on the wing is reduced;
   wherein the aircraft comprises
      a restraining assembly operable between
         a restraining mode in which the wing tip device is held in the flight configuration using a restraining force, a releasing mode in which the restraining force on the wing tip device is released, such that the wing tip device is able to adopt the load alleviating configuration, and wherein the wing tip device is entirely free to rotate when the restraining assembly is in the releasing mode.

* * * * *